(12) United States Patent
Moore et al.

(10) Patent No.: US 7,735,907 B2
(45) Date of Patent: Jun. 15, 2010

(54) PILLAR FOR MOTOR VEHICLE AND TOOL FOR MAKING THE SAME

(75) Inventors: Jaime Nicole Moore, Canton, MI (US); Stuart W. Bailey, Tecumseh, MI (US); Nobiaki Kitaura, Aichi-Ken (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 39 days.

(21) Appl. No.: 11/965,059

(22) Filed: Dec. 27, 2007

(65) Prior Publication Data

US 2009/0167059 A1 Jul. 2, 2009

(51) Int. Cl.
*B62D 25/04* (2006.01)

(52) U.S. Cl. .............................. 296/193.06; 296/203.03

(58) Field of Classification Search ............ 296/193.06, 296/203.03
See application file for complete search history.

(56) References Cited

U.S. PATENT DOCUMENTS

| | | | |
|---|---|---|---|
| 4,002,049 A | 1/1977 | Randolph, Sr. | |
| 4,535,619 A | 8/1985 | Gargrave | |
| 5,347,838 A | 9/1994 | Matsuoka et al. | |
| 5,431,590 A | 7/1995 | Abbas | |
| 5,746,082 A | 5/1998 | Matsuoka et al. | |
| 5,784,916 A | 7/1998 | Matsuoka et al. | |
| 6,038,908 A | 3/2000 | Kinoshita et al. | |
| 6,196,040 B1 | 3/2001 | Matsuoka et al. | |
| 6,230,536 B1 | 5/2001 | Matsuoka et al. | |
| 6,240,671 B1 | 6/2001 | Galfidi, Jr. | |
| 6,499,478 B1 | 12/2002 | Perez | |
| 6,539,766 B2 | 4/2003 | Matsuoka et al. | |
| 6,578,909 B1 * | 6/2003 | Reed et al. | 296/210 |
| 6,619,095 B2 | 9/2003 | Matsuoka et al. | |
| 7,290,831 B2 * | 11/2007 | Poss et al. | 296/203.03 |

* cited by examiner

*Primary Examiner*—Patricia L Engle
*Assistant Examiner*—Pinel E Romain
(74) *Attorney, Agent, or Firm*—Gifford, Krass, Sprinkle, Anderson & Citkowski, P.C.

(57) ABSTRACT

A stamped metal panel used as part of a pillar of a motor vehicle includes a main wall, an outer side wall, an inner side wall and a transitional portion. The outer side wall extends from one side of the main wall. The inner side wall extends from an opposite side of the main wall and forms a generally U-shaped cross section with the main wall and the outer side wall. The inner side wall has a first wall that extends from the main wall and a second wall that extends from an end of the first wall opposite from the main wall. The transitional portion extends arcuately between the first wall and the second wall. The transitional portion is substantially tangential with at least the first wall of the first side wall to facilitate removal of the panel from between upper and lower halves of a stamping tool.

9 Claims, 6 Drawing Sheets

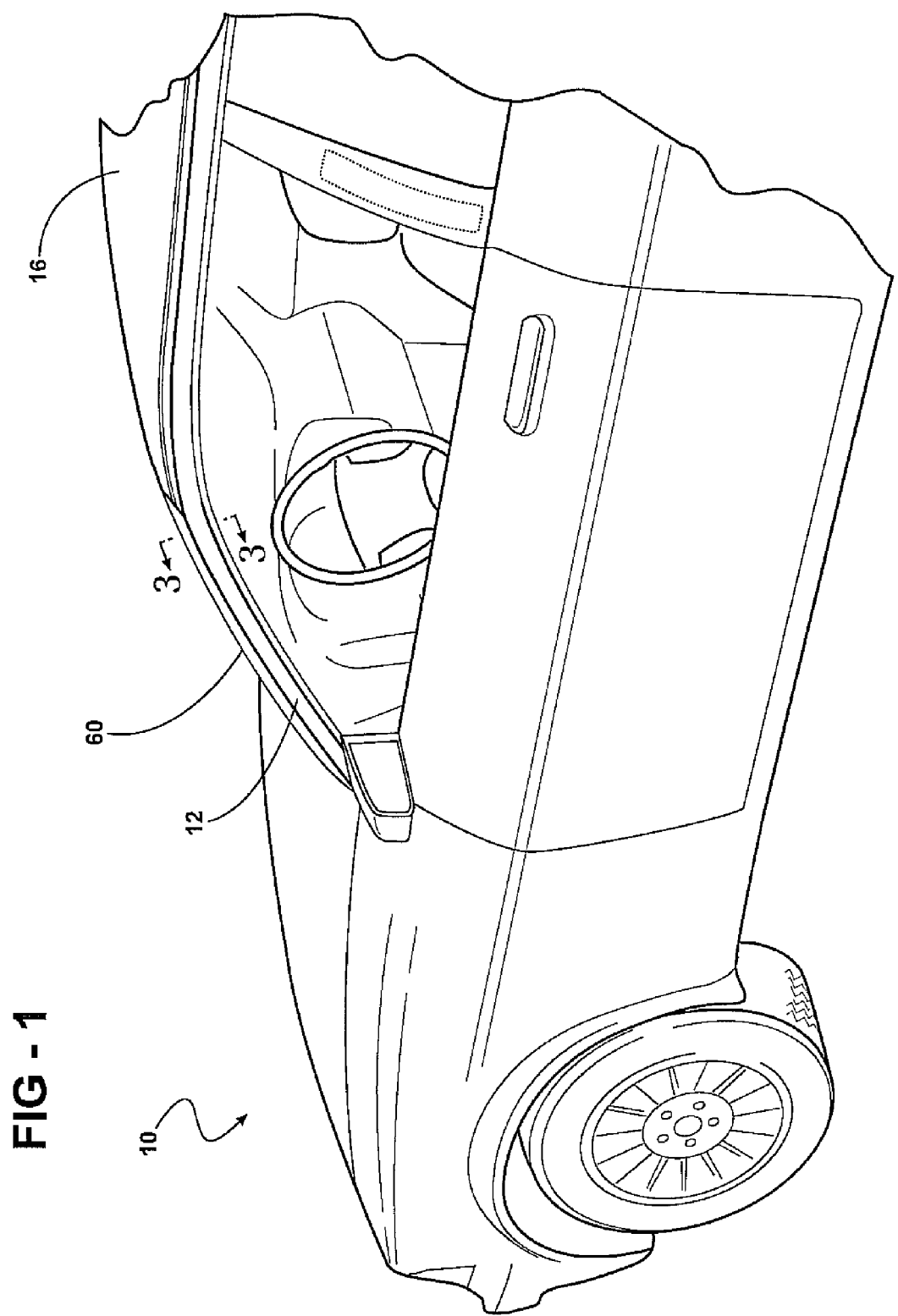

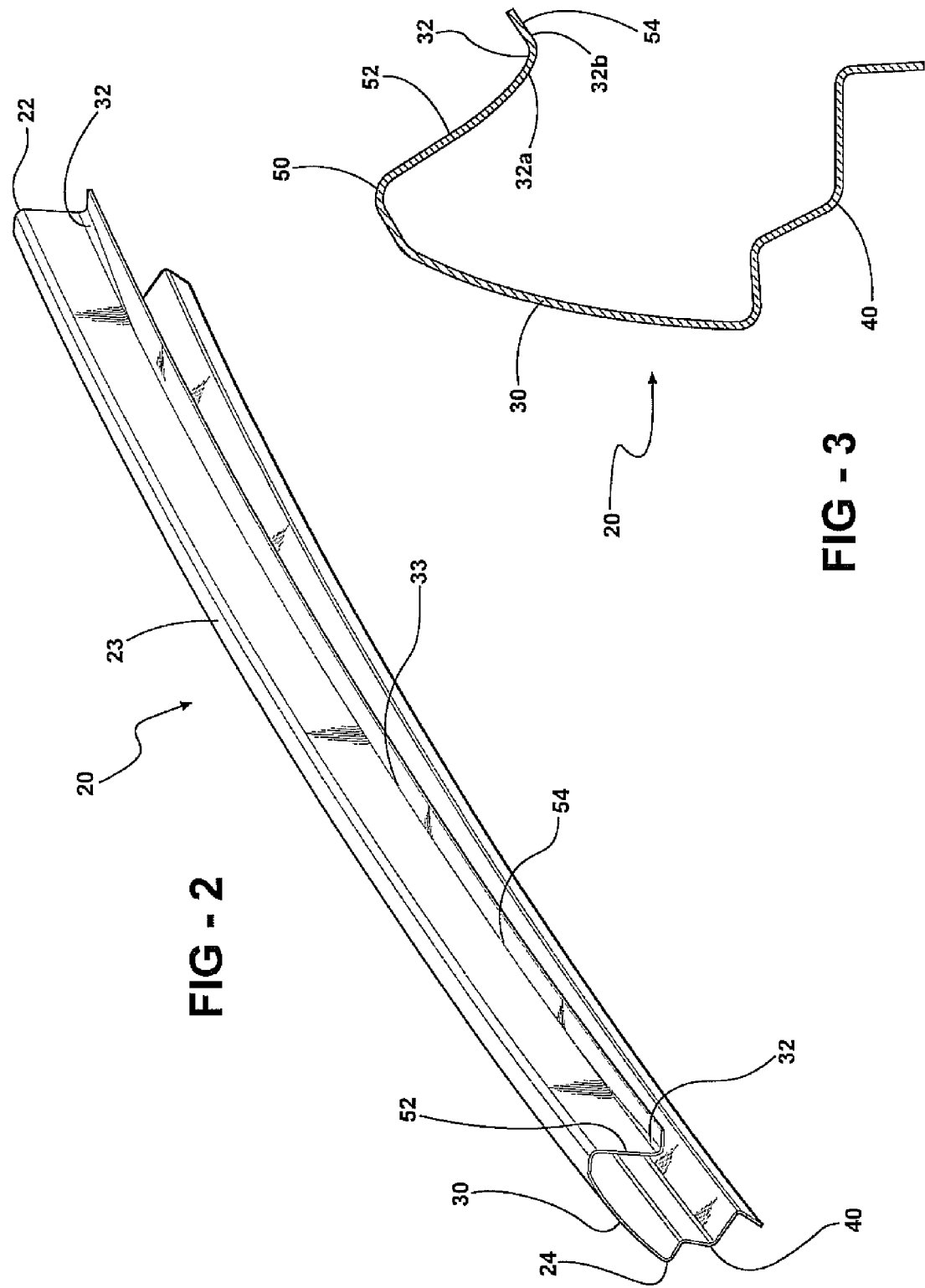

PILLAR FOR MOTOR VEHICLE AND TOOL FOR MAKING THE SAME

FIELD OF THE INVENTION

The invention relates to stamped metal panels for motor vehicles. More particularly, the invention relates to a stamped pillar and a tool for making the same.

BACKGROUND OF THE INVENTION

Rotary cams are typically used in stamping tools when it is necessary to form a negative angle in a stamped metal panel. A negative angle means that a flange bends back toward a main portion of the stamping. The rotary cam is a die which can be rotated after the part is stamped to permit removal of the workpiece from the stamping machine. Styling and design of panels for motor vehicles can be limited by the location of the cam. In forming curved pillars for motor vehicles, for example, a step may be provided along a window support flange of the pillar to avoid a die-lock condition as the rotary cam is rotated after formation of the pillar and, thereby, offer more flexibility in terms of styling/design and cam placement. The use of such a step, however, can conflict with a desire to maintain a generally flat window seal surface along the window support flange and minimize flange length. The step can also adversely affect the glass edge condition or clearance, or side wall sealing condition.

Thus, it remains desirable to provide an improved stamped panel or pillar design that allows for greater styling flexibility, while meeting certain tooling requirement and/or design criteria, such as flat window seal surface. It also remains desirable to utilize as few cams as possible in the stamping process.

SUMMARY OF THE INVENTION

According to one aspect of the invention, a stamped metal panel is provided for use as part of a pillar of a motor vehicle. The pillar extends along a window or windshield of the motor vehicle. The pillar has a generally U-shaped cross section formed by a main wall, an outer side wall and an inner side wall. The inner side wall has a first wall that extends from the main wall. The inner side wall also has a second wall that extends from an end of the first wall and supports a side of the window. The pillar includes a transitional portion that extends arcuately between the first wall and the second wall and is substantially tangential with the first wall of the inner side wall.

According to another aspect of the invention, a stamping tool includes an upper die and a lower die cooperative to form the above panel. The lower die includes a first part forming the outer side wall and a second part forming the inner side wall. The second part of the lower die is rotatable about a rotational axis positioned along a line that is generally parallel with the second wall and that extends through an intersection between the first wall and the transitional portion as defined in a cross section that extends transversely through the panel and is generally orthogonal to the rotational axis.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is a perspective view of a motor vehicle enlarged to show a stamped panel according to one embodiment of the invention;

FIG. 2 is a perspective view of the panel;

FIG. 3 is a cross sectional view of the panel as taken through the line indicated at 3-3 in FIG. 1;

DETAILED DESCRIPTION OF THE INVENTION

Figure 4:
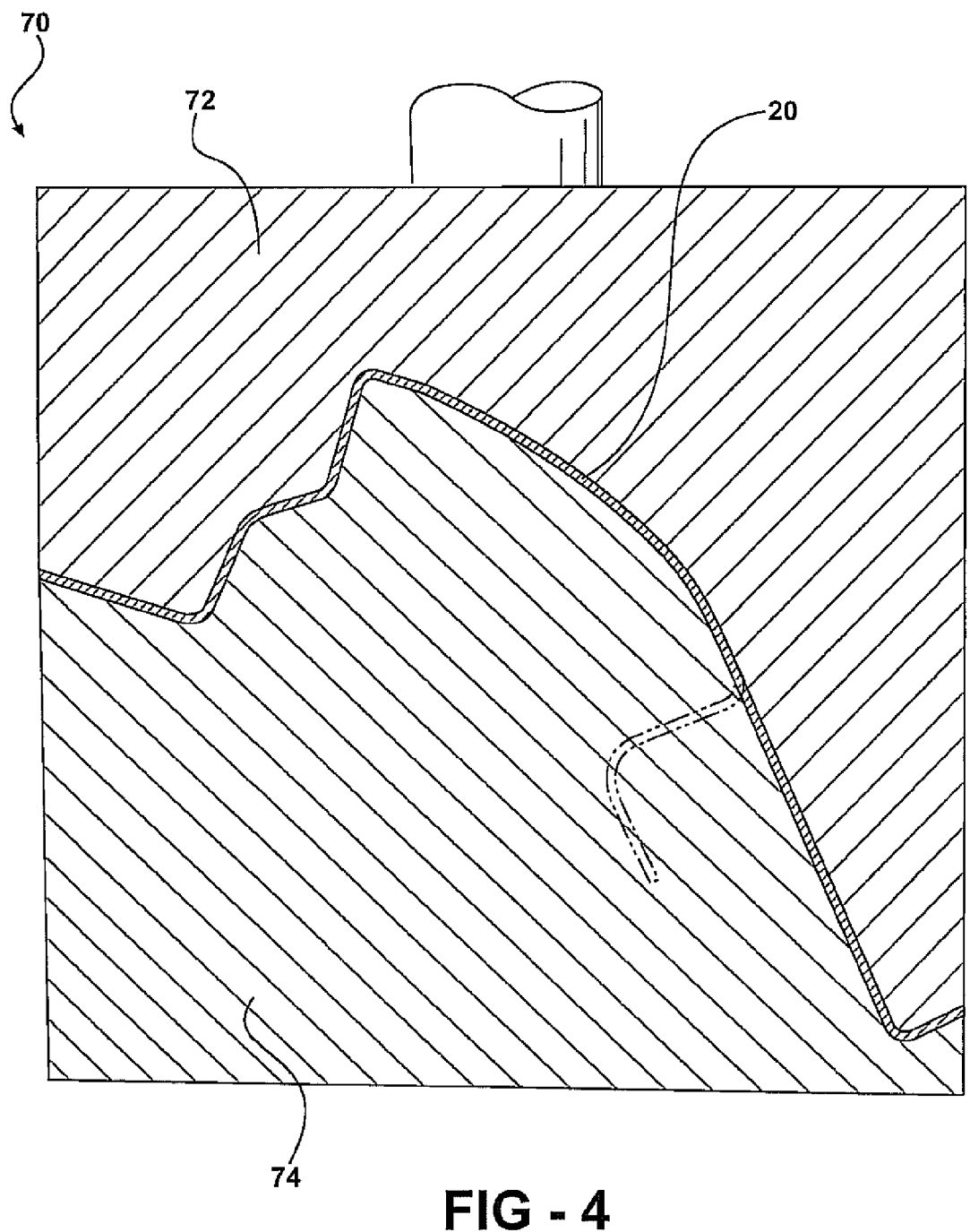
FIG. 4 is a cross sectional view of the panel partially formed and a stamping tool for forming a portion of the panel from a blank of sheet metal.

Referring to FIG. 1, a motor vehicle is generally indicated at 10. The motor vehicle 10 includes generally upright pillars 12 extending between a "beltline" of the vehicle body and the roof 16. Described in greater detail below, the invention provides a design for a stamped panel that is used as part of the pillar 12 and a tool for making the same or other similarly shaped stamped panels for use on the motor vehicle 10.

Referring to FIG. 2, a panel according to one embodiment of the invention is indicated at 20. The panel 20 forms at least a portion of one of the pillars 12 and/or a portion of a side outer body panel or other similar panel. The panel 20 has a body 23 extending between opposite top 22 and bottom 24 ends. The panel 20 extends longitudinally along a curve between the top 22 and bottom 24 ends.

Referring to FIG. 3, the panel 20 has a generally U-shaped cross section defined by a main wall 30, an outer side wall 40 and an inner side wall 50. The side walls 40, 50 extend from respective outer and inner sides of the main wall 30. The inner side wall 50 includes a bent portion having a first wall 52 and a second wall 54. The second wall 54 is disposed on an opposite end of the first wall 52 from the main wall 30. The second wall 54 extends generally orthogonally from the first wall 52 and supports a windshield, window or glass 60 (FIG. 1). Preferably, the first wall 52 is substantially flat to provide a sealing surface for the glass 60.

The first wall 52 extends toward the other of the side wall 50 at a generally acute angle relative to the main wall 30. This results in a "negative angle" which poses the potential for a die lock condition during the formation of the panel. As such, a pivoting cam arrangement is provided in a stamping tool to form the panel, which allows removal of the panel from the tool after the panel is formed. Further, a transitional portion is formed in the panel, which provides increased flexibility in the design of the pivoting cam and location of the rotational axis for the pivoting cam in the tool.

A transitional portion 32 is formed between the first wall 52 and the second wall 54 along at least part of the inner side wall 50. Depending on the radius of the curvature of the panel 20 between the top end 22 and the bottom end 24, the transitional portion may not necessarily extend along the entire length of the panel 20. Thus, in one embodiment, transitional portions 32 are provided at the top end 22 and the bottom end 24 of the panel 20. The transitional portion 32 is widest at the ends 22, 24 of the panel 20 and transitions or tapers to a corner-shape 33 formed between the first 52 and second 54 walls. It should be appreciated that the corner-shape 33 may include a minimal fillet for manufacturability. In another embodiment, the transitional portions 32 are generally tangential with respect to the first wall 52 and/or second wall 54 of the inner side wall 50. The transitional portion 32 extends along a compound curve, with a first portion 32a of the curve being substantially centered about a cam axis 86 (FIGS. 6-7) and tangential to the first wall 52, and a second portion 32b of the curve being tangential to both the first portion 32a and the second wall 54. In still another embodiment of the invention, the transitional portion 32 is arcuate in the longitudinal direction of the panel 20 and is generally tangential to the longitudinal curve of the panel 20, which facilitates removal of the finished panel 20 from the stamping tool.

Figure 5:
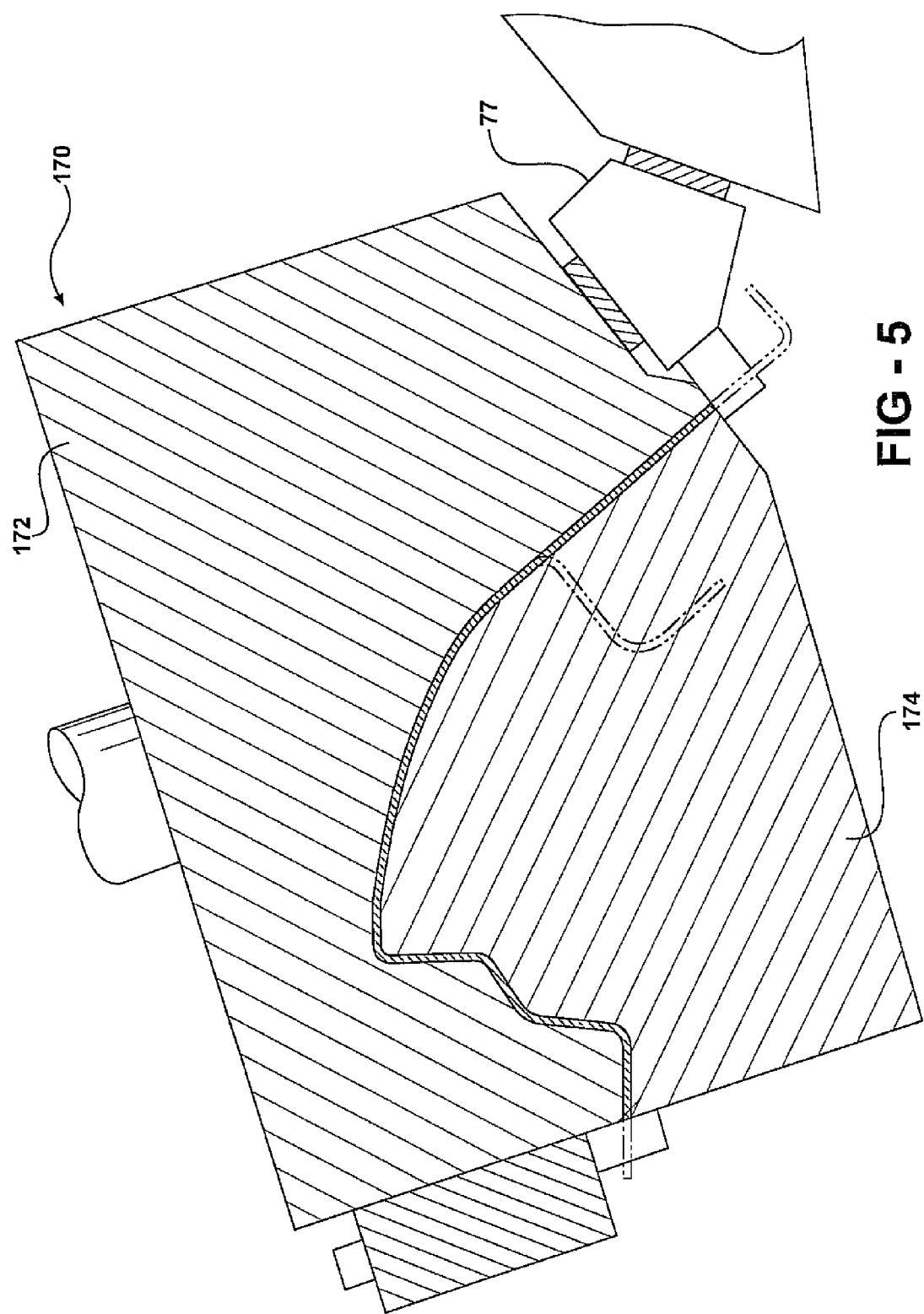
FIG. 5 is a cross sectional view of the panel partially formed and a tool for removing excess material from a portion of the panel.
Figure 6:
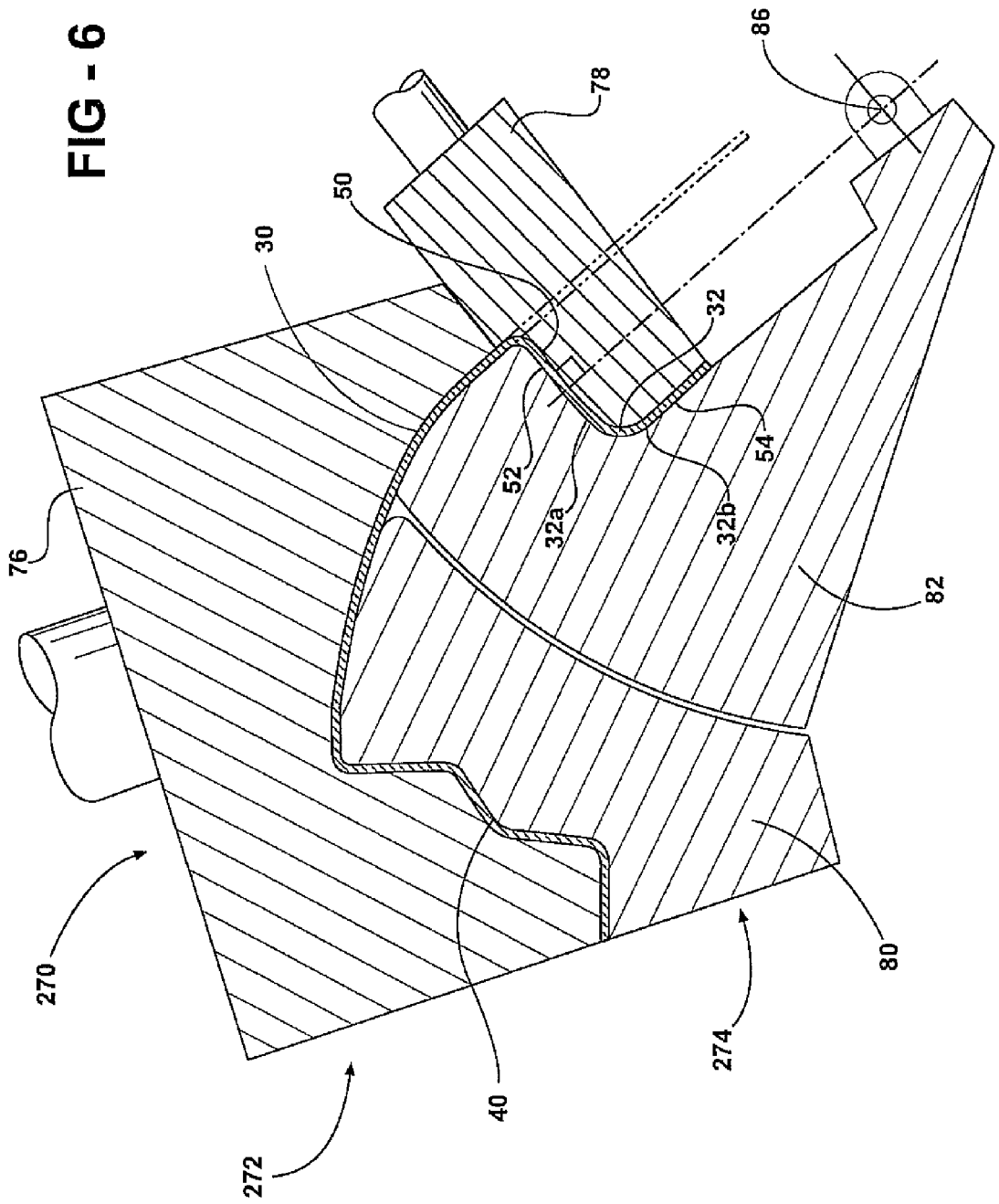
FIG. 6 is a cross sectional view of the panel and a tool for forming a window supporting wall of the panel.

In FIGS. 4-6, a process for forming the panel 20 from a blank sheet of steel is illustrated. Referring to FIG. 4, a panel stamping tool 70 is illustrated. The stamping tool 70 includes an upper die 72 and a lower die 74 which can be pressed toward each other to form a portion of the panel 20 from a blank sheet of steel. The dotted lines in FIGS. 4-5 indicate the intended final form of the panel 20. Referring to FIG. 5, the partially formed panel 20, as formed in the process illustrated in FIG. 4, is supported between upper 172 and lower 174 dies of a second tool 170. A salvage end 79 of the panel 20 is cut using a cutting die 77.

Figure 7:
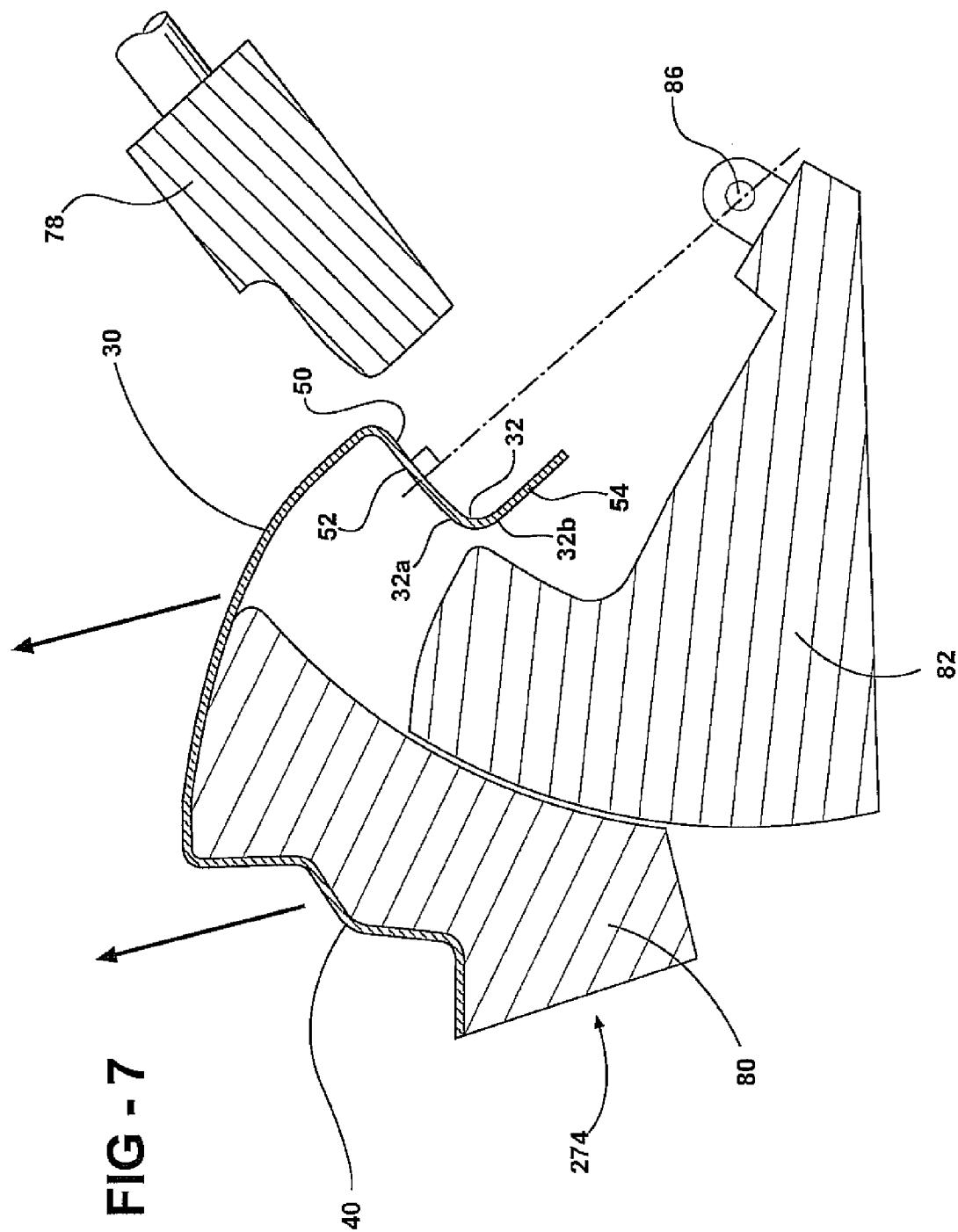
FIG. 7 is a cross sectional view of the panel and tool showing retraction of a rotating cam of a lower die of the tool.

Referring to FIG. 6, the partially formed panel 20 is then placed between the upper 272 and lower 274 dies of a third tool 270. The upper die 272 includes a first portion 76 and a second portion 78. The lower die 274 includes a first part 80 and a second part 82. The first 76 and second 78 portions of the upper die 272 and the first part 80 of the lower die 274 may be movable along generally linear paths. Alternatively, other movements of these die components 76, 78, 80 are possible and/or one or more of these die components 76, 78, 80 may be fixed. The second part 82 of the lower die 274 is rotatable about a rotational axis 86 between a use position, as shown in FIG. 6, and a retracted position, as shown in FIG. 7.

The first portion 76 of the upper die 272 and the lower die 274 of the third tool 270 are pressed toward each other to support the partially formed panel 20 therebetween. At this point, the second part 82 of the lower die 274 is in the use position. The second portion 78 of the upper die 272 is then pressed toward the second part 82 of the lower die 274 to form a remaining portion of the main wall 30 and the inner side wall 50, as shown in FIG. 6. The dotted lines in FIG. 6 indicate the portions of the panel 20 prior to being pressed between the second portion 78 of the upper die 272 and the second part 82 of the lower die 274.

With the panel 20 formed, the upper die 272 can be moved away from the lower die 274 to allow removal of the panel 20 from between the upper 272 and lower 274 dies. Due to the negative angle of the side walls 40, 50 relative to the main wall 30, however, the second part 82 of the lower die 274 must first be rotated about the axis 86 to the retracted position, as illustrated in FIG. 7, before the panel 20 can be removed from the tool 270. The transitional portion 32 adjacent the top 22 and bottom 24 ends of the panel 20 allows the second part 82 of the lower die 274 to rotate about the axis 86 without interfering without the side wall 50.

As mentioned, the transitional portion 32 facilitates removal of the finished panel 20 from the tool by allowing retraction of the second part 82 after formation of the panel 20. Additionally, the transitional portion 32 provides greater flexibility in die location of the rotational axis 86 of the second part 82 of the lower die 274. Placing the rotational axis "below" (as viewed from the orientation of the figures) the second wall 54, in general, allows the design of a substantially flat window seal surface along the first wall 52. Such placement of the rotational axis, however, may result in a large unsupported portion of the panel, interference between the second part 82 and the other portions of the panel 20, such as the outer side wall 40, and/or not enough tool to support part of the inner side wall 50 during formation. A conventional step may be placed at the intersection between the first wall 52 and the second wall 54 to allow higher positioning of the rotational axis 86, but this can generally reduce the amount of flat window seal surface along the first wall 52, and reduce the flange flat area along the second wall 54.

Providing the transitional portion 32, as discussed herein, between the first wall 52 and the second wall 54 allows optimization of the amount of flat window seal surface along the first wall 52 while meeting other stamping or formability requirements, such as avoiding die-lock conditions or minimizing the amount of unsupported areas along the panel during the stamping process. The transitional portion 32 also allows maximization of the flat area along the second wall 54 for supporting and attacking the glass to the vehicle body. Maximizing the flat area allows the window support flange length to be minimized. Minimizing window support flange length, in turn, decreases the size of the pillar as an obstruction to the view of the driver and reduces overall vehicle mass.

The stamping tool of the present invention, as discussed above, provides a number of advantages over conventional designs. For example, the stamping tool of the present invention allows for the design of a single cam in a stamping tool to form a longer portion of a part where conventional tools would otherwise utilize a plurality of cams to form the same portion of the part. Minimizing the number of cams in a tool lowers tooling costs and processing time during production and, therefore, significantly reduces costs.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A panel for use as part of a pillar that extends along a window of the motor vehicle, the panel comprising:

an elongated member having a first end opposite a second end and a main wall extending between the first and second ends, the elongated member further includes an outer side wall extending from one side of the main wall and an inner side wall extending from the opposite side of the main wall, and the inner side wall, main wall, and outer side wall form a generally U-shaped cross section, and the inner side wall has a first wall angled relative to the inner side wall so as to extend towards the main wall, the first wall having a first wall edge extending between the first end and the second end, the elongated member further including a second wall having a second wall edge, a portion of the second wall edge is in communication with a corresponding portion of the first wall edge so as to form a corner, the corner extending transversely along a portion of the elongated member, and the second wall is generally orthogonal to the first wall and extends away from the outer side wall, the second wall is operable to support a side of the window; and a transitional portion interconnecting the remaining portion of the second wall edge to the remaining portion of the first wall edge, the transitional portion tapers as the transitional portion extends from the first end of the elongated member to the corner.

2. A panel as set forth in claim 1, wherein the elongated member extends generally arcuately between the top and second ends of the panel.

3. A panel as set forth in claim 1, wherein the transitional portion includes a pair of transitional portions, one of the pair of transitional portions extends from the first end of the panel and the other of the pair of transitional portions extends from the second end of the panel.

4. A panel as set forth in claim 1, wherein the transitional portion is substantially tangential with respect to a longitudinal arc of the panel between the first end and the second end thereof.

5. A panel as set forth in claim 4, wherein the first wall extends at a substantially acute angle with respect to the main wall.

6. A panel as set forth in claim 1, wherein the transitional portion includes an outer surface, and the outer surface extends along a curve that is substantially compound.

7. A panel as set forth in claim 6, wherein the curve includes a first portion tangential with the first wall.

8. A panel as set forth in claim 7, wherein the curve includes a second portion tangential with both the first portion of the curve and the second wall of the inner side wall.

9. A stamping tool for forming the panel of claim 1, said tool comprising:

an upper die; and a lower die cooperative with the upper die to form the panel, the lower die comprising a first part forming the outer side wall and a second part forming the inner side wall, the second part of the lower die being rotatable about a rotational axis, where the rotational axis of the second part of the lower die is positioned along a line that is generally parallel with the second wall and that extends through an intersection between the first wall and the transitional portion as defined in a cross section that extends transversely through the panel and is generally orthogonal to the rotational axis.

\* \* \* \* \*

UNITED STATES PATENT AND TRADEMARK OFFICE
CERTIFICATE OF CORRECTION

| | | |
|---|---|---|
| PATENT NO. | : 7,735,907 B2 | Page 1 of 1 |
| APPLICATION NO. | : 11/965059 | |
| DATED | : June 15, 2010 | |
| INVENTOR(S) | : Jaime Nicole Moore et al. | |

It is certified that error appears in the above-identified patent and that said Letters Patent is hereby corrected as shown below:

Column 3 line 53 delete "without"

Column 3 line 58 replace "die" with --the--

Column 4 line 14 replace "attacking" with --attaching--

Signed and Sealed this

Twenty-third Day of November, 2010

David J. Kappos
*Director of the United States Patent and Trademark Office*